United States Patent
Mackin

(10) Patent No.: US 10,336,461 B2
(45) Date of Patent: Jul. 2, 2019

(54) AIRCRAFT ENGINE AND ASSOCIATED METHOD FOR DRIVING THE FAN WITH THE LOW PRESSURE SHAFT DURING TAXI OPERATIONS

(71) Applicant: The Boeing Company, Chicago, IL (US)

(72) Inventor: Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 9 days.

(21) Appl. No.: 14/988,267

(22) Filed: Jan. 5, 2016

(65) Prior Publication Data

US 2017/0190441 A1    Jul. 6, 2017

(51) Int. Cl.
*B64C 25/50* (2006.01)
*B64D 41/00* (2006.01)
*B64D 27/10* (2006.01)
*B64D 27/00* (2006.01)
*B64D 33/00* (2006.01)
*B64D 35/00* (2006.01)
*F01D 15/10* (2006.01)
(Continued)

(52) U.S. Cl.
CPC ............ *B64D 41/00* (2013.01); *B64D 27/00* (2013.01); *B64D 27/10* (2013.01); *B64D 33/00* (2013.01); *B64D 35/00* (2013.01); *F01D 15/10* (2013.01); *F01D 25/36* (2013.01); *F02C 7/36* (2013.01); *F02K 3/06* (2013.01); *F05D 2220/36* (2013.01)

(58) Field of Classification Search
CPC ................................................ B64D 2205/00
See application file for complete search history.

(56) References Cited

U.S. PATENT DOCUMENTS 7,966,806 B2    6/2011  Henry et al.
2007/0101721 A1    5/2007  Dooley et al.
(Continued)

FOREIGN PATENT DOCUMENTS

EP    1785614    5/2007
EP    2452876    5/2012
(Continued)

OTHER PUBLICATIONS

Extended European Search Report for European Patent Application No. 16205029.8 dated May 30, 2017, 7 pages.
(Continued)

*Primary Examiner* — Richard G Davis
(74) *Attorney, Agent, or Firm* — Alston & Bird LLP

(57) ABSTRACT

An aircraft engine, an electric taxi system and a corresponding method are provided to facilitate taxiing without operation of the core gas turbine engine by driving the fan assembly with the electric taxi system during taxi operations. An aircraft engine is provided that includes a core gas turbine engine including a compressor, a combustor and a high pressure turbine. The aircraft engine also includes a fan assembly coupled to the core gas turbine engine. The aircraft engine further includes an electric taxi system coupled to the fan assembly. The electric taxi system includes an energy storage device and a motor responsive to energy provided by the energy storage device. The motor is coupled to the fan assembly and is configured to drive the fan assembly during taxi operations.

31 Claims, 3 Drawing Sheets

(51) Int. Cl.
*F02C 7/36* (2006.01)
*F01D 25/36* (2006.01)
*F02K 3/06* (2006.01)

(56) References Cited

U.S. PATENT DOCUMENTS

| | | | | |
|---|---|---|---|---|
| 2012/0119020 | A1* | 5/2012 | Burns | B64D 27/00 |
| | | | | 244/58 |
| 2012/0258838 | A1* | 10/2012 | Hartz | B60K 6/40 |
| | | | | 477/5 |
| 2015/0013306 | A1* | 1/2015 | Shelley | F02K 5/00 |
| | | | | 60/224 |
| 2015/0183511 | A1* | 7/2015 | Ott | B64C 19/00 |
| | | | | 244/50 |
| 2015/0244296 | A1* | 8/2015 | Edwards | F02C 9/00 |
| | | | | 290/40 B |
| 2016/0214727 | A1* | 7/2016 | Hamel | B64D 27/18 |
| 2017/0129617 | A1* | 5/2017 | Shah | B64D 27/24 |
| 2017/0225794 | A1* | 8/2017 | Waltner | B64D 31/06 |

FOREIGN PATENT DOCUMENTS

| | | |
|---|---|---|
| EP | 2889219 | 7/2015 |
| EP | 2910739 | 8/2015 |
| EP | 3048042 | 7/2016 |
| RU | 2028252 | 2/1995 |
| RU | 2325307 | 5/2008 |
| RU | 2456205 | 7/2012 |
| WO | WO-2010/067172 | 6/2010 |

OTHER PUBLICATIONS

*EGTS-electric taxiing system. Introducing the future of aircraft taxiing* [online][retrieved Apr. 14, 2016]. Retrieved from the Internet: <URL: http://www.greentaxiing.com/>.

Office Action for Russian Application No. 2016142740/11 dated Apr. 10, 2018, 27 pages.

\* cited by examiner

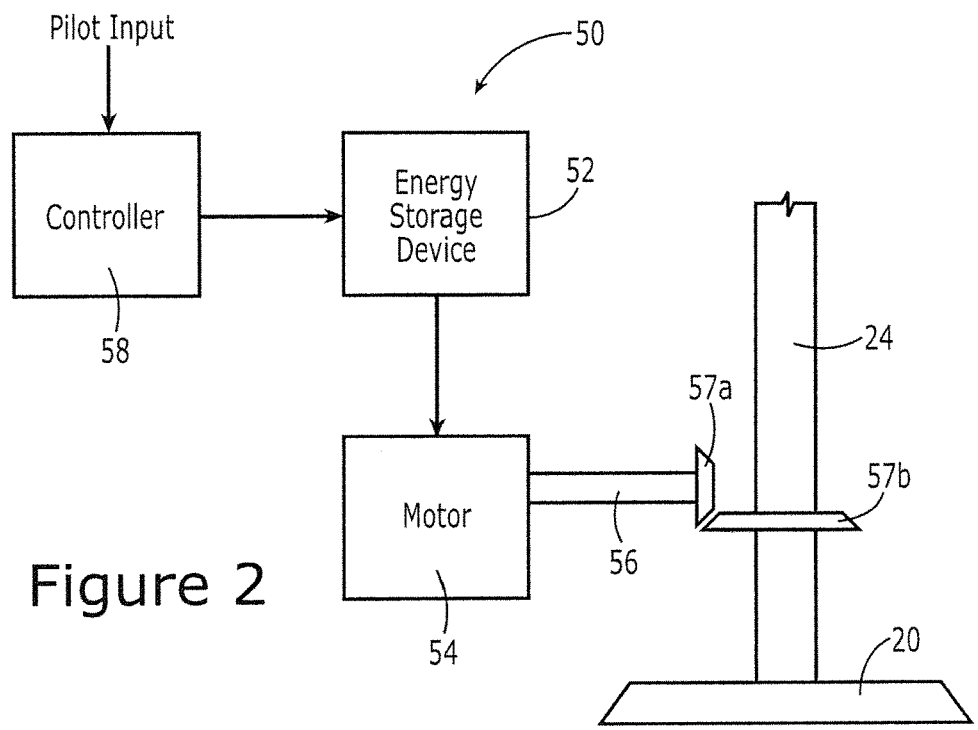
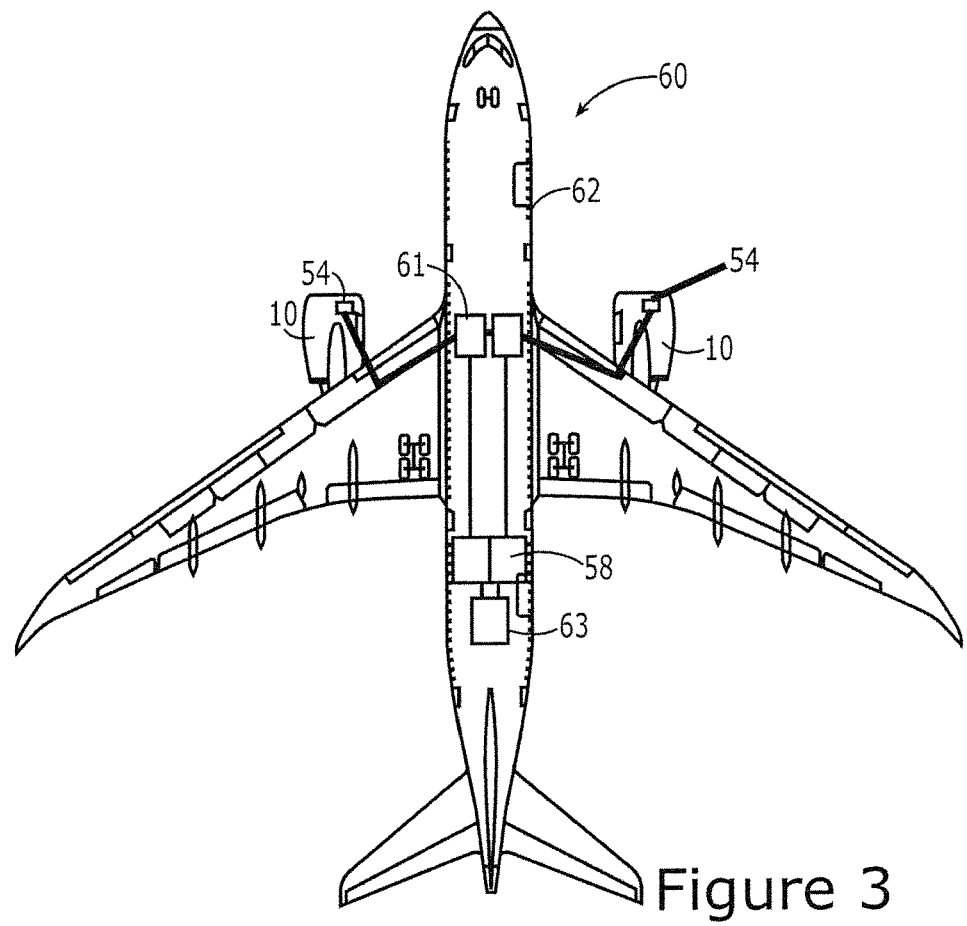
Figure 2
Figure 3

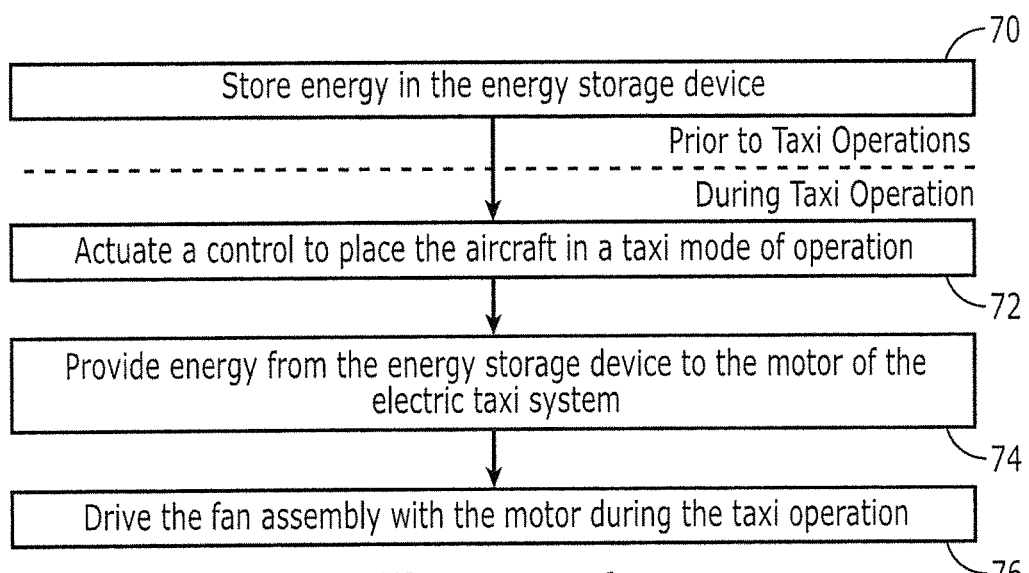

AIRCRAFT ENGINE AND ASSOCIATED METHOD FOR DRIVING THE FAN WITH THE LOW PRESSURE SHAFT DURING TAXI OPERATIONS

TECHNOLOGICAL FIELD

An example embodiment relates generally to a technique for driving the fan during taxi operations and, more particularly, to driving the fan with the low pressure shaft during taxi operations.

BACKGROUND

In order to taxi, an aircraft operates its engines at idle speed with occasional increases in engine speed to start motion or speed up taxi. Nearly all of the engine thrust is created by the engine fan which is driven by the engine core exhaust running through a turbine coupled via a shaft to the fan. However, the idle speed of some modern aircraft engines causes the fan to be rotated at a speed that is sufficiently high so as to cause the aircraft to travel too quickly for at least some taxi operations. Thus, pilots may be forced to routinely apply the brakes concurrent with the operation of the engines at idle speed in order to appropriately control the speed of the aircraft during taxi operations. Having to regularly utilize the brakes to control the speed of the aircraft during taxi operations increases the brake wear and leads to less productive use being made of the fuel consumed during taxi operations.

Alternatively, an aircraft may include a drive system separate from the aircraft engines in order to provide motive power to the aircraft during taxi operations. In this regard, the landing gear may include a separate drive system that may be powered during taxi operations in order to provide the motive force for the aircraft during taxi operations. However, a separate drive system to provide the motive force during taxi operations may increase the cost of the aircraft as well as the weight and corresponding fuel consumption of the aircraft. Moreover, an additional drive system dedicated to providing the motive force for the aircraft during taxi operations may include an additional set of controls that a pilot must operate in order to drive the aircraft during taxi operations, thereby adding to the complexity of the cockpit and the training requirements for a pilot.

BRIEF SUMMARY

An aircraft engine, an electric taxi system and a corresponding method are provided in accordance with an example embodiment in order to provide the motive force for the aircraft during taxi operations. By utilizing the electric taxi system, a pilot may operate the aircraft during taxi operations utilizing the same controls as are utilized during flight. Additionally, the aircraft need not include an additional system for providing the motive force during taxi operations, thereby avoiding any increase in the cost of the aircraft, while correspondingly avoiding any increase in the weight and fuel consumption of the aircraft. The aircraft engine, the electric taxi system and the corresponding method of an example embodiment of the present disclosure are configured to drive the fan assembly of the aircraft engine with energy provided by an energy storage device of the electric taxi system such that the speed of the aircraft is appropriate for taxi operations, thereby permitting the core gas turbine engine of the aircraft engine to be shut off during taxi operations and avoiding some brake wear and fuel consumption.

In an example embodiment, an aircraft engine is provided that includes a core gas turbine engine including a compressor, a combustor and a high pressure turbine. The aircraft engine also includes a fan assembly coupled to the core gas turbine engine. The aircraft engine further includes an electric taxi system coupled to the fan assembly. The electric taxi system includes an energy storage device, such as a flywheel energy storage device, and a motor responsive to energy provided by the energy storage device. The motor is coupled to the fan assembly and is configured to drive the fan assembly during a taxi operation.

The motor of an example embodiment includes a variable frequency starter generator powered by the energy storage device and configured to drive the fan assembly during the taxi operation. Alternatively, the motor may include a pneumatic motor configured to drive the fan assembly during the taxi operation. The energy storage device of an example embodiment is configured to receive energy from an onboard auxiliary power unit and/or from a remote energy supply while on the ground. In an example embodiment in which the fan assembly includes a fan and a low pressure shaft coupled to the fan, the motor is configured to drive the low pressure shaft which, in turn, drives the fan during the taxi operation.

In another example embodiment, an electric taxi system is provided that includes an energy storage device, such as a flywheel energy storage device, configured to store energy and a motor responsive to energy provided by the energy storage device. The electric taxi system also includes a motor drive shaft configured to couple the motor to a fan assembly of an aircraft engine such that the fan assembly is driven by the electric taxi system during a taxi operation.

The electric taxi system of an example embodiment also includes a controller configured to cause the motor to drive the motor drive shaft and, in turn, the fan assembly. In an embodiment in which the fan assembly includes a fan and a low pressure shaft coupled thereto, the electric taxi system also includes one or more gears configured to couple the motor drive shaft to the low pressure shaft of the fan assembly. The motor of an example embodiment includes a variable frequency starter generator powered by the energy storage device and configured to drive the fan assembly during the taxi operation. Alternatively, the motor may include a pneumatic motor configured to drive the fan assembly during the taxi operation. The energy storage device may be configured to receive energy from an onboard auxiliary power unit and/or from a remote energy supply while on the ground.

In a further embodiment, a method is provided for supporting a taxi operation of an aircraft that includes an aircraft engine having a core gas turbine engine and a fan assembly. The method of this example embodiment includes storing energy in an energy storage device of an electric taxi system. During the taxi operation in which the core gas turbine engine is shut off, the method also includes driving the fan assembly with the electric taxi system by providing energy from the energy storage device to a motor of the electric taxi system and then driving the fan assembly with the motor during the taxi operation.

The method of an example embodiment drives the fan assembly with the motor by causing the motor to drive a motor drive shaft of the electric taxi system and, in turn, the fan assembly. In this example embodiment in which the fan assembly includes a fan and a low pressure shaft coupled thereto, the method drives the fan assembly with the motor by coupling the motor drive shaft to the low pressure shaft of the fan assembly with one or more gears. The method of an example embodiment drives the fan assembly with the electric taxi system by controlling the fan assembly during the taxi operation with one or more thrust levers utilized to drive the aircraft engine during flight. In regards to storing energy in the energy storage device, the method of an example embodiment charges the energy storage device with energy derived from rotation of the fan assembly during landing.

BRIEF DESCRIPTION OF THE DRAWINGS

Figure 1:
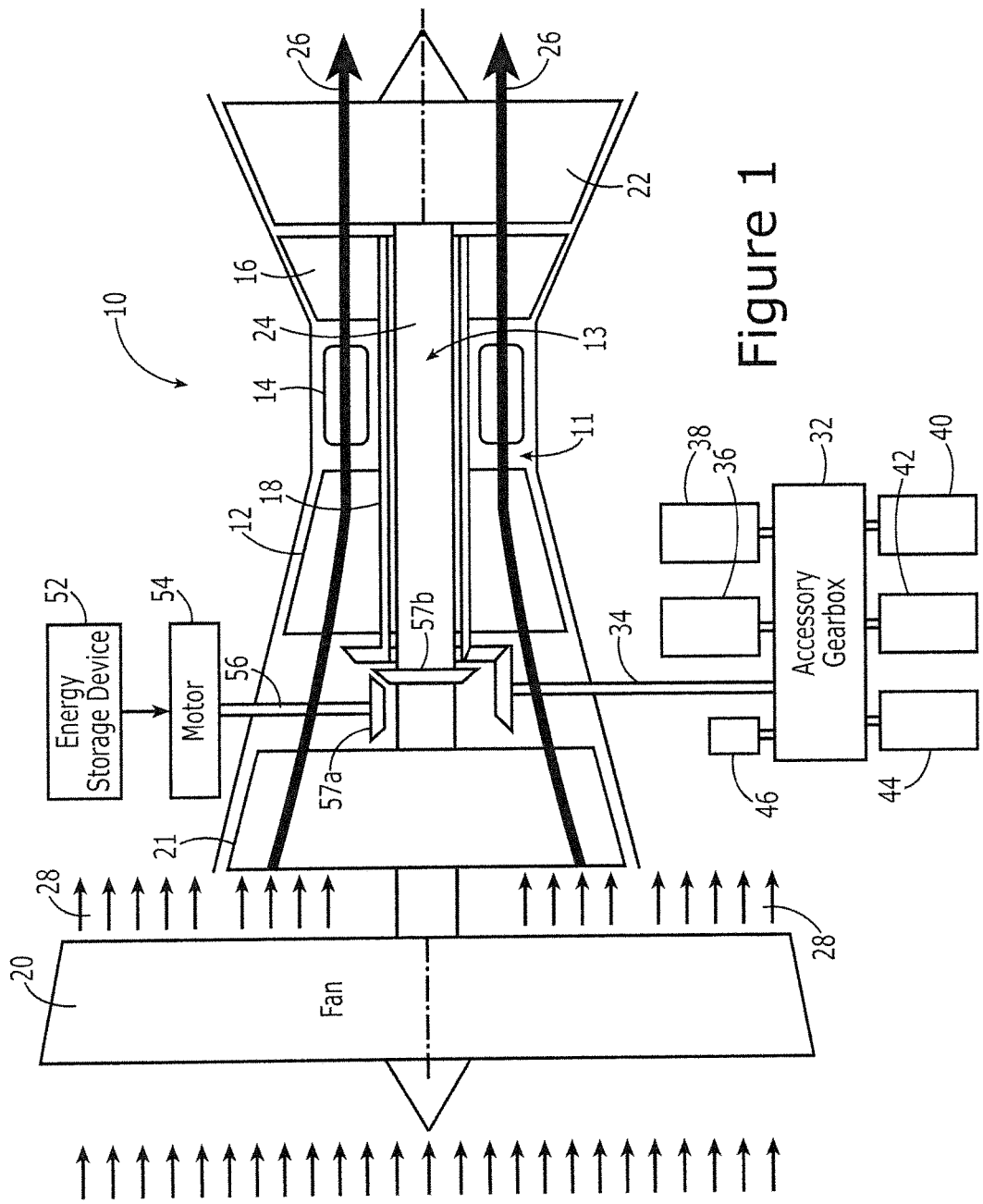

Having thus described embodiments of the present disclosure in general terms, reference will now be made to the accompanying drawings, which are not necessarily drawn to scale, and wherein:

FIG. 1 is a schematic representation of an aircraft engine in accordance with an example embodiment of the present disclosure;

FIG. 2 is a schematic representation of an electric taxi system in accordance with an example embodiment of the present disclosure;

FIG. 3 is a plan view of an aircraft that illustrates placement of components of an electric taxi system in accordance with an example embodiment of the present disclosure; and FIG. 4 is a flowchart illustrating operations performed in accordance with an example embodiment of the present disclosure.

DETAILED DESCRIPTION

Embodiments of the present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

An aircraft engine, an electric taxi system and an associated method are provided in order to controllably drive the fan assembly of an aircraft engine with the electric taxi system in order to provide the motive force required by the aircraft during taxi operations. As shown in FIG. 1, an aircraft engine 10, such as a turbofan, includes a core gas turbine engine 11 and a fan assembly 13. The core gas turbine engine 11 may be referenced as the high pressure spool and includes a compressor 12, a combustor 14 and a high pressure turbine 16. The compressor 12 is coupled to the high pressure turbine 16 by a first shaft, that is, the high pressure shaft 18. The fan assembly 13 may be referenced as the low pressure spool and includes a fan 20 and a booster compressor 21 coupled to another turbine 22, namely, a low pressure turbine, via a second shaft, that is, the low pressure shaft 24. The high pressure and low pressure shafts 18, 24 are arranged in a concentric relationship with the high pressure shaft 18 of an example embodiment being disposed concentrically about the low pressure shaft 24. The high pressure spool and the low pressure spool can operate at different pressures with the high pressure spool operating at a higher pressure than the low pressure spool.

In operation, fuel is injected into the combustor 14 and ignited. The resulting exhaust gases drive the high pressure turbine 16, which is coupled to the compressor 12 via the high pressure shaft 18. The compressor 12 is therefore also driven. After driving the high pressure turbine 16, the partially spent exhaust gas is directed downstream through the low pressure turbine 22. Since the low pressure turbine 22 is coupled to the fan 20 via the low pressure shaft 24, the fan is also driven. As a result, the fan assembly 13 is operationally coupled to the core gas turbine engine 11 even though the fan assembly and the core gas turbine engine, including the high pressure shaft 18 and the low pressure shaft 24, are not mechanically coupled to one another. As shown in FIG. 1, some of the air 26 generated by the fan 20 is sent through the core gas turbine engine 11 and utilized in the combustion process. However, the majority of the air 28 generated by the fan 20 is bypassed around the core gas turbine engine 11 and is utilized to generate thrust.

The aircraft engine 10 of the example embodiment depicted in FIG. 1 also includes an accessory gearbox 32 connected by a shaft 34 to the high pressure shaft 28. The accessory gearbox 32 may, in turn, provide power to various accessories including, for example, a fuel pump 36, a lubrication pump 38, a hydraulic pump 42, a generator 44 and/or a permanent magnet generator (PMG) 46. In various embodiments, the engine 10 further includes a starter 40, that in the illustrated embodiment is coupled to the accessory gearbox 32 and functions to start the aircraft engine 10.

In accordance with an example embodiment of the present disclosure and as shown in FIGS. 1-3, an electric taxi system 50 is provided that causes the fan 20 to be driven during taxi operations. As such, the speed of the aircraft created by rotation of the fan 20 is sufficient for taxi operations, but is not excessive so as to reduce the need for a pilot to operate the brakes during taxi operations. By driving the fan 20 using the electric taxi system 50, the aircraft can perform taxi operations while the core gas turbine engine 11 is shut off. The electric taxi system 50 may be installed on an existing aircraft engine or the aircraft engine may be initially manufactured so as to incorporate the electric taxi system.

In this regard and as shown in FIGS. 2 and 3, an aircraft 60 in accordance with an example embodiment includes an electric taxi system 50 that, in turn, includes an energy storage device 52 for providing energy to the fan assembly 13, via the low pressure shaft 24, during taxi operations. The energy storage device 52 may be embodied in various manners. In an example embodiment, the energy storage device 52 is embodied by a flywheel energy storage device 61. While the flywheel energy storage device 61 may be mounted at various locations onboard the aircraft 60, the flywheel energy storage device of an example embodiment is mounted remote from the aircraft engine 10, such as within the body 62 of the aircraft, as shown in FIG. 3. The flywheel storage device 61 can be charged at the aircraft gate using ground power. The ground power powers a motor/generator and spools up the flywheel storing power as kinetic energy. Power can be extracted from the flywheel 61 via the motor/generator which is part of the flywheel storage system. Instead of or in addition to a flywheel energy storage device 61, the energy storage device 52 may be embodied by an auxiliary power unit 63 configured to provide power to one or more systems of the aircraft 60 in a manner independent of the aircraft engines 10. In a further embodiment, the energy storage device 52 may be embodied as one or more batteries installed on the aircraft 60, In an embodiment in which the energy storage device 52 is embodied as a flywheel energy storage device 61, the flywheel energy storage device may receive energy from various sources and may store the energy for subsequent delivery during taxi operations. For example, the flywheel energy storage device 61 of one example embodiment is configured to receive energy from an onboard auxiliary power unit 63. Additionally or alternatively, the flywheel energy storage device 61 may be configured to receive energy from a remote energy supply while the aircraft 60 is on the ground, that is, from ground power such as may be provided by an electric ground cart. Thus, the flywheel energy storage device 61 may receive energy from ground power in advance of a flight.

As shown in FIGS. 1 and 2, the electric taxi system 50 also includes a motor 54 responsive to energy provided by the energy storage device 52. During a taxi operation, the motor 54 is configured to drive the low pressure shaft 24 and the low pressure shaft is, in turn, configured to drive the fan 20. In order to permit the motor 54 to drive the low pressure shaft 24, the electric taxi system 50 of an example embodiment also includes a motor drive shaft 56, such as a tower shaft, that is driven by the motor and a pair of bevel gears 57a and 57b that mechanically couple the motor drive shaft to the low pressure shaft. In the illustrated embodiment, the bevel gear 57a is coupled to a distal end of the shaft 56, at an opposite end from the motor 54, and the bevel gear 57b is coupled to the low pressure shaft 24. In the exemplary embodiment, the bevel gear 57b is installed between the booster compressor 21 and the core gas turbine engine 11. However, it should be realized that the electric taxi system 50 may be coupled at any location on the low pressure shaft 24 such that the motor 54 is enabled to rotate the low pressure shaft 24.

The motor 54 of an example embodiment is a variable frequency starter generator. The variable frequency starter generator is powered by the energy storage device 52 and is configured to drive the low pressure shaft 24, via the motor drive shaft 56 and the bevel gears 57a and 57b, during the taxi operations. While the variable frequency starter generator may be located at various positions onboard the aircraft 60, the frequency starter generator of the example embodiment depicted in FIG. 3 is carried by the aircraft engine 10, such as by being mounted upon the accessory gear box 32 of the aircraft engine. As an alternative to the variable frequency starter generator, the motor 54 of another example embodiment is a pneumatic motor, such as a pneumatic starter. The pneumatic motor of this example embodiment is powered by bleed air from an auxiliary power unit 63 and is configured to drive the low pressure shaft 24 during taxi operations.

The electric taxi system 50 of an example embodiment also includes an electric taxi control system, such as a controller 58, that is configured to control the operations of the electric taxi system, such as in the manner described below. Among other functions, the controller 58 may control the charging of the energy storage device 52 and the provision of energy from the energy storage device to the motor 54. Further, the controller 58 is configured to control the manner in which the motor 52 drives the low pressure shaft 24. More specifically, the operator may utilize the controller 58 to control the rotational speed of the motor 52 and thus the rotational speed of the fan 20. For example, when the motor 52 is operated at a first rotational speed, the fan 20 generates a first amount of thrust. If for example, the rotational speed of the motor 52 is increased, the fan 20 will generate an increased quantity of thrust. As a result, the amount of thrust generated by the fan 20 is directly proportional to the speed of the motor 52 which is controlled by the controller 58. The controller 58 is also carried by the aircraft 60 and, in one embodiment is carried in body 62 of the aircraft, such as within a portion of the body of the aircraft that is not pressurized. The controller 58 of an example embodiment will reside in the aircraft electronics bay located generally below the front door of the aircraft.

During taxi operations, the electric taxi system 50 is actuated with the controller 58 directing the motor 54, such as the variable frequency starter generator or the pneumatic motor, to cause rotation of the low pressure shaft 24 which, in turn, causes rotation of the fan 20. The rotation of the fan 20 generates the motive force necessary for driving the aircraft 60 during taxi operations. As a result of driving the fan 20 with the low pressure shaft 24, the rotation of the fan allows for the aircraft 60 to be moved with a sufficient, but controlled speed during taxi operations, thereby avoiding excessive use of the brakes. Additionally by providing the energy to cause rotation of the fan 20 during taxi operations from an energy supply device 52, the core gas turbine engine 11 may be shut off while taxiing such that fuel is conserved.

As illustrated in FIG. 4, the operations performed in accordance with an example embodiment of the present disclosure are depicted. Prior to engaging in taxi operations, energy is stored in an energy storage device 52, such as a flywheel energy storage device 61 or an auxiliary power unit 63. See block 70. In this regard, the energy stored in the energy storage device 52 may be energy provided by an auxiliary power unit 63 or energy from a remote energy supply while the aircraft 60 is on the ground. Additionally or alternatively, the energy storage device 52 may be charged with energy derived from rotation of the fan 20 during landing with the fan serving as a source of power to drive the generator. By utilizing a motor 54 in the form of a variable frequency starter generator in one embodiment, the low pressure spool may be used to charge the energy storage device, such as a flywheel energy storage device 61. During descent in an instance in which the fan 20 may otherwise provide more thrust than is desired, the variable frequency starter generator on the low pressure spool may attenuate the thrust to slow the fan, extract energy and reduce thrust. In an example embodiment, the variable frequency starter generator may be installed on an accessory gearbox that has two power input shafts from the engine. As the foregoing examples illustrate, the energy storage device 52 may be charged prior to flight, during flight and/or following flight, such as during a landing.

During a taxi operation, the core gas turbine engine 11 is shut off and the fan assembly 13 is then driven by the electric taxi system 50. In this regard, the fan assembly 13 is driven by the electric taxi system 50 by controllably providing energy from the energy storage device 52 to the motor 54 of the electric taxi system and then driving the fan assembly with the motor during the taxi operation. See blocks 74 and 76 of FIG. 4. In an example embodiment, the fan assembly 13 is driven by the motor 54 by causing the motor to drive the motor shaft assembly 56 of the electric taxi system 50 and, in turn, the fan assembly. In an example embodiment in which the fan assembly 13 includes a fan 20 and a low pressure shaft 24 coupled thereto, the fan assembly may also be driven by the motor 54 by coupling the motor drive shaft 56 to the low pressure shaft of the fan assembly with one or more gears 57. As such, the rotation of the motor drive shaft 56 by the motor 54 causes the low pressure shaft 24 and, in turn, the fan 20 to correspondingly rotate.

As a result of the aircraft 60 being driven during taxi operations by the electric taxi system 50, the core gas turbine engine 11 may be shut off during taxi operations in order to conserve fuel and to permit the taxi speed of the aircraft to be controlled with less use of the brakes. As a result of having shut off the core gas turbine engine 11, the fan 20 may be driven by the low pressure shaft 24 during the taxi operation without contribution by the high pressure shaft 18. In order to further reduce the braking requirements, the aircraft 60 may be slowed by utilizing the motor 54 as a generator such that rotation of the fan 20 serves to recharge the energy storage device 52.

In an example embodiment, a pilot may actuate a control, such as a button, a switch or the like, to place the aircraft 60 in a taxi mode of operation in which the fan assembly 13 of the aircraft engine 10 is driven by the electric taxi system 50. See block 72. Thereafter, the pilot may control the fan assembly 13 during the taxi operation utilizing the same one or more thrust levers that are utilized to control the engine 10 during flight, although the input provided via the thrust levers is interpreted by the controller 58 of the electric taxi system 50 during taxi operations to control the manner in which the fan assembly 13 is driven without causing the high pressure shaft 18 to be driven—unlike utilization of the same thrust levers during flight operations that controls the manner in which the high pressure shaft is driven. During the taxi operation, however, the control provided by the one or more thrust levers is interpreted by the controller 58 of the electric taxi system 50 to control the delivery of energy from the energy storage device 52 to the motor 54 so as to cause the motor to drive the fan assembly 13 to generate a predetermined quantity of thrust. For example, the engine thrust levers may be set so that full retract of the levers terminates engine idle and defines the Off position for electric taxi positions. In this example, a half throttle setting may be the maximum electric taxi thrust. During taxi operations, the levers would often be Of and then pushed forward to move and then returned to the Off position since taxiing is often a lot of stop and go. As such, the aircraft 60 may be driven during taxi operations utilizing controls with which a pilot is already familiar, thereby making the taxi operations more intuitive and avoiding any increase in the complexity of the cockpit and its controls.

By way of example of the use of the electric taxi system 50 in conjunction with an aircraft 60 transitioning from the gate to the runway in order to take off, the electric taxi system may be activated at the gate without correspondingly activating the core gas turbine engine 11. In order to support the use of the electric taxi system 50, the energy storage device 52 may be charged prior to the activation of the electric taxi system, such as from an onboard auxiliary power unit 63 and/or from a remote energy supply while the aircraft 60 is on the ground, that is, from ground power such as may be provided by an electric ground cart. In response to pilot inputs provided by the one or more thrust levers, the controller 58 of the electric taxi system 50 controls the delivery of energy from the energy storage device 52 to the motor 54 so as to cause the motor to control the rotational speed of the fan assembly 13 and thus control the amount of thrust generated by the aircraft engine 10. As such, the aircraft 60 may taxi from the gate to the runway without activating the core gas turbine engine 11, thereby conserving fuel and maintaining the desired taxi speed without excessive use of the brakes. As it typically takes about 5 minutes from start initiation of the core gas turbine engine 11 to having full takeoff power available from the core gas turbine engine 11, the core gas turbine engine may be powered on or lit when the aircraft 60 is second or third in the queue for departure. As such, when the aircraft's turn for takeoff arrives, the electric taxi system 50 may be deactivated and the pilot may then utilize the one or more thrust levers to control the core gas turbine engine during the takeoff, flight and landing phases.

Upon landing, the core gas turbine engine 11 may be shut off and the electric taxi system 50 may be activated in order to permit the pilot to taxi the aircraft in the same manner as described above. In addition to permitting the aircraft 60 to taxi at the desired speed with reduced fuel consumption and brake wear, the taxiing of the aircraft that is provided by the electric taxi system 50 with the core gas turbine engine 11 shut off also serves to cool down the components of the core gas turbine engine. As the shafts, such as the low pressure shaft 24, may bow when subjected to both heat from the core gas turbine engine 11 and gravity, the deactivation of the core gas turbine engine during taxi operations permits the components of the core gas turbine engine to be cooled, thereby reducing the likelihood that the shafts, such as the low pressure shaft, will bow.

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific ones disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

That which is claimed:

1. An aircraft engine of an aircraft comprising:
    a core gas turbine engine including a compressor, a combustor and a high pressure turbine connected to the compressor by a high pressure shaft, wherein the core gas turbine engine is responsive to one or more thrust levers during flight;
    a fan assembly coupled to the core gas turbine engine; and
    an electric taxi system coupled to the fan assembly, the electric taxi system comprising an energy storage device and a motor responsive to energy provided by the energy storage device, wherein the motor is coupled to the fan assembly and is configured to drive the fan assembly during a taxi operation, wherein the motor is also configured to operate as a generator during the taxi operation such that rotation of the fan assembly while the aircraft is taxiing recharges the energy storage device,
    wherein the electric taxi system is responsive to a control actuated by a pilot to place the aircraft into a taxi mode of operation, wherein the electric taxi system further comprises a controller configured to cause the motor to drive the fan assembly and wherein the controller is responsive to the one or more thrust levers that are utilized both: (i) to drive the aircraft engine during flight and (ii) to operate the electric taxi system during the taxi operation without causing the high pressure shaft to be driven, and wherein the controller is configured to interpret input from the one or more thrust levers differently depending upon whether the aircraft is in flight or in the taxi mode of operation.

2. An aircraft engine according to claim 1 wherein the motor comprises a variable frequency starter generator powered by the energy storage device and configured to drive the fan assembly during the taxi operation.

3. An aircraft engine according to claim 1 wherein the motor comprises a pneumatic motor configured to drive the fan assembly during the taxi operation.

4. An aircraft engine according to claim 1 wherein the energy storage device is configured to receive energy from an onboard auxiliary power unit.

5. An aircraft engine according to claim 1 wherein the energy storage device is configured to receive energy from a remote energy supply while on the ground.

6. An aircraft engine according to claim 1 wherein the energy storage device comprises a flywheel energy storage device.

7. An aircraft engine according to claim 6 wherein the flywheel energy storage device is remote from other portions of the aircraft engine and within a body of an aircraft, and wherein the controller is also within the body of the aircraft.

8. An aircraft engine according to claim 7 wherein the controller is disposed in an aircraft electronics bay.

9. An aircraft engine according to claim 1 wherein the fan assembly comprises a fan and a low pressure shaft coupled to the fan, wherein the motor is configured to drive the low pressure shaft which, in turn, drives the fan during the taxi operation.

10. An aircraft engine according to claim 1 wherein the control actuated by the pilot to place the aircraft into the taxi mode of operation comprises a button or a switch.

11. An aircraft engine according to claim 1 wherein the electric taxi system further comprises a pair of gears to couple the motor to the low pressure shaft at a location between the fan assembly and the core gas turbine engine.

12. An aircraft engine according to claim 11 wherein the fan assembly comprises a booster compressor, and wherein the pair of gears couple the motor to the low pressure shaft at a location between the booster compressor of the fan assembly and the compressor of the core gas turbine engine.

13. An electric taxi system of an aircraft comprising:
an energy storage device configured to store energy;
a motor responsive to energy provided by the energy storage device;
a motor drive shaft configured to couple the motor to a fan assembly of an aircraft engine such that the fan assembly is driven by the electric taxi system during a taxi operation; and
a controller configured to cause the motor to drive the fan assembly wherein the controller is responsive to one or more thrust levers that are utilized both to drive the aircraft engine during flight and to operate the electric taxi system during the taxi operation,
wherein the motor is also configured to operate as a generator during the taxi operation such that rotation of the fan assembly while the aircraft is taxiing recharges the energy storage device,
wherein the electric taxi system is responsive to a control actuated by a pilot to place the aircraft into a taxi mode of operation, and
wherein the controller is configured to interpret the one or more thrust levers differently depending upon whether the aircraft is in flight or in the taxi mode of operation.

14. An electric taxi system according to claim 13 wherein the fan assembly comprises a fan and a low pressure shaft coupled thereto, and wherein the electric taxi system further comprises one or more gears configured to couple the motor drive shaft to the low pressure shaft of the fan assembly.

15. An electric taxi system according to claim 13 wherein the motor comprises a variable frequency starter generator powered by the energy storage device and configured to drive the fan assembly during the taxi operation.

16. An electric taxi system according to claim 13 wherein the motor comprises a pneumatic motor configured to drive the fan assembly during the taxi operation.

17. An electric taxi system according to claim 13 wherein the energy storage device is configured to receive energy from an onboard auxiliary power unit.

18. An electric taxi system according to claim 13 wherein the energy storage device is configured to receive energy from a remote energy supply while on the ground.

19. An electric taxi system according to claim 13 wherein the energy storage device comprises a flywheel energy storage device.

20. An electric taxi system according to claim 19 wherein the flywheel energy storage device is remote from other portions of the aircraft engine and within a body of an aircraft, and wherein the controller is also within the body of the aircraft.

21. An electric taxi system according to claim 20 wherein the controller is disposed in an aircraft electronics bay.

22. An electric taxi system according to claim 13 wherein the control actuated by the pilot to place the aircraft into the taxi mode of operation comprises a button or a switch.

23. An electric taxi system according to claim 13 further comprising a pair of gears to couple the motor drive shaft to a low pressure shaft of a core gas turbine engine at a location between the fan assembly and the core gas turbine engine.

24. An aircraft engine according to claim 23 wherein the pair of gears couple the motor drive shaft to the low pressure shaft at a location between a booster compressor of the fan assembly and a compressor of the core gas turbine engine.

25. A method of supporting a taxi operation of an aircraft, wherein the aircraft comprises an aircraft engine that includes a core gas turbine engine and a fan assembly, and wherein the method comprises:
storing energy in an energy storage device of an electric taxi system;
during the taxi operation in which the core gas turbine engine is shut off, driving the fan assembly with the electric taxi system by providing energy from the energy storage device to a motor of the electric taxi system and then driving the fan assembly with the motor during the taxi operation, wherein the electric taxi system is responsive to a control actuated by a pilot to place the aircraft into a taxi mode of operation, wherein driving the fan assembly with the electric taxi system comprises controlling the fan assembly during the taxi operation with one or more thrust levers that are also utilized to drive the aircraft engine during flight, wherein controlling the fan assembly comprises controlling the fan assembly during the taxi operation with the one or more thrust levers without causing a high pressure shaft of the core gas turbine engine to be driven, and wherein the one or more thrust levers are interpreted by the controller differently depending upon whether the aircraft is in flight or in the taxi mode of operation; and recharging the energy storage device utilizing rotation of the fan assembly while the aircraft is taxiing by operating the motor of the electric taxi system as a generator during the taxi operation.

26. A method according to claim 25 wherein driving the fan assembly with the motor comprises causing the motor to drive a motor drive shaft of the electric taxi system and, in turn, the fan assembly.

27. A method according to claim 26 wherein the fan assembly comprises a fan and a low pressure shaft coupled thereto, and wherein driving the fan assembly with the motor further comprises coupling the motor drive shaft to the low pressure shaft of the fan assembly with one or more gears.

28. A method according to claim 25 wherein storing energy in the energy storage device comprises charging the energy storage device with energy derived from rotation of the fan assembly during landing.

29. A method according to claim 25 wherein the control actuated by the pilot to place the aircraft into the taxi mode of operation comprises a button or a switch.

30. A method according to claim 25 wherein driving the fan assembly with the electric taxi system during the taxi operation comprises coupling the motor to the low pressure shaft with a pair of gears located between the fan assembly and the core gas turbine engine.

31. A method according to claim 30 wherein coupling the motor to the low pressure shaft comprises coupling the motor to the low pressure shaft with the pair of gears located between a booster compressor of the fan assembly and a compressor of the core gas turbine engine.

* * * * *